(12) United States Patent
Onishi et al.

(10) Patent No.: US 8,036,445 B2
(45) Date of Patent: Oct. 11, 2011

(54) PATTERN MATCHING METHOD, PROGRAM AND SEMICONDUCTOR DEVICE MANUFACTURING METHOD

(75) Inventors: Atsushi Onishi, Yokohama (JP); Tadashi Mitsui, Kamakura (JP); Yuichiro Yamazaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 920 days.

(21) Appl. No.: 11/255,024

(22) Filed: Oct. 21, 2005

(65) Prior Publication Data

US 2006/0110042 A1 May 25, 2006

(30) Foreign Application Priority Data

Oct. 21, 2004 (JP) ................................. 2004-307285

(51) Int. Cl.
*G06K 9/00* (2006.01)
(52) U.S. Cl. ........ 382/144; 382/141; 382/145; 382/146; 382/147; 382/148; 382/149; 382/150; 382/151; 382/173; 382/197; 382/199; 382/203; 382/209
(58) Field of Classification Search .......... 382/141–151, 382/199, 197, 204, 209, 242
See application file for complete search history.

(56) References Cited

U.S. PATENT DOCUMENTS 6,111,984 A * 8/2000 Fukasawa ...................... 382/209
6,330,354 B1 * 12/2001 Companion et al. ........... 382/150
6,647,146 B1 * 11/2003 Davison et al. ................ 382/199

(Continued)

FOREIGN PATENT DOCUMENTS
JP 2002-328015 11/2002
(Continued)

OTHER PUBLICATIONS

Chaudhuri, B.B.; Kundu, M.K.; Digital line segment coding: A new efficient contour coding scheme. Computers and Digital Techniques, IEE Proceedings E, vol. 131, Issue 4, Jul. 1984 pp. 143-147.*

(Continued)

*Primary Examiner* — Bhavesh Mehta
*Assistant Examiner* — Julian Brooks
(74) *Attorney, Agent, or Firm* — Finnegan, Henderson, Farabow, Garrett & Dunner, L.L.P.

(57) ABSTRACT

A pattern matching method includes: detecting an edge of a pattern in a pattern image obtained by imaging the pattern; segmenting the detected pattern edge to generate a first segment set consisting of first segments; segmenting a pattern edge on reference data which serves as a reference for evaluating the pattern to generate a second segment set consisting of second segments; combining any of the segments in the first segment set with any of the segments in the second segment set to define a segment pair consisting of first and second segments; calculating the compatibility coefficient between every two segment pairs in the defined segment pairs; defining new segment pairs by narrowing down the defined segment pairs by calculating local consistencies of the defined segment pairs on the basis of the calculated compatibility coefficients and by excluding segment pairs having lower local consistencies; determining an optimum segment pair by repeating the calculating the compatibility coefficient and the defining new segment pairs by narrowing down the segment pairs; calculating a feature quantity of a shift vector that links the first and second segments making up the optimum segment pair; and performing position matching between the pattern image and the reference data on the basis of the calculated feature quantity of the shift vector.

12 Claims, 10 Drawing Sheets

U.S. PATENT DOCUMENTS

| | | | |
|---|---|---|---|
| 6,718,062 B1 * | 4/2004 | Zhang et al. | 382/218 |
| 6,772,089 B2 * | 8/2004 | Ikeda et al. | 702/159 |
| 6,868,175 B1 * | 3/2005 | Yamamoto et al. | 382/145 |
| 2003/0059104 A1 * | 3/2003 | Mitsui | 382/145 |
| 2004/0096092 A1 * | 5/2004 | Ikeda | 382/199 |
| 2006/0023933 A1 * | 2/2006 | Mitsui | 382/145 |
| 2006/0262977 A1 * | 11/2006 | Mitsui | 382/209 |
| 2007/0248258 A1 * | 10/2007 | Mitsui | 382/151 |
| 2007/0280547 A1 * | 12/2007 | Mitsui | 382/253 |
| 2008/0056558 A1 * | 3/2008 | Mitsui | 382/144 |
| 2008/0138916 A1 * | 6/2008 | Mitsui | 438/16 |

FOREIGN PATENT DOCUMENTS

JP    2003-178314    6/2003

OTHER PUBLICATIONS

Fujita et al., "Pattern Matching Between an SEM Exposed Pattern Image of LSI Fine Structures and CAD Layout Data by Using the Relaxation Method", LSI Testing Symposium 2004 (Japan), pp. 7-12, (2004), Abstract.

\* cited by examiner

SEM IMAGE

CAD DATA

PATTERN MATCHING METHOD, PROGRAM AND SEMICONDUCTOR DEVICE MANUFACTURING METHOD

CROSS REFERENCE TO RELATED APPLICATIONS

This application claims benefit of priority under 35USC §119 to Japanese patent application No. 2004-307285, filed on Oct. 21, 2004, the contents of which are incorporated by reference herein.

BACKGROUND OF THE INVENTION

1. Field of the Invention

The present invention relates to a pattern matching method, program and a semiconductor device manufacturing method and, is directed to position matching between an image of a semiconductor pattern and CAD data, for example.

2. Related Art

The accuracy of patterns in semiconductor lithography processes has been managed conventionally by measuring the dimensions of line patterns and the internal diameters of hole patterns in an image obtained with an SEM (Scanning Electron Microscope).

However, with the recent advances in miniaturization of LSIs (Large Scale Integrated Circuits), there is an increasing need of measuring a particular portion of patterns having complex geometries on the basis of tolerance data provided while LSIs are designed in addition to measuring the average dimensions of simple patterns. Accurate position matching between design data and an SEM image is a prerequisite for performing such measurement.

There has been one method for matching an SEM image to design data, in which an edge image is generated from CAD data, for example, and the SEM image, the edge image is smoothed with a smoothing filter, and then matching is performed based on the correlation between the images (Japanese Patent Laid-Open No. 2002-328015, for example).

However, the method disclosed in Japanese Patent Laid-Open No. 2002-328015 has a problem that when a high-magnification SEM image is obtained in order to evaluate changes in geometry, the difference between a geometry in the SEM image and a geometry in CAD data is large, which degrades the accuracy of matching.

SUMMARY OF THE INVENTION

According to a first aspect of the invention, there is provided a pattern matching method comprising:

detecting an edge of a pattern in a pattern image obtained by imaging the pattern;

segmenting the detected pattern edge to generate a first segment set consisting of first segments;

segmenting a pattern edge on reference data which serves as a reference for evaluating the pattern to generate a second segment set consisting of second segments;

combining any of the segments in the first segment set with any of the segments in the second segment set to define a segment pair consisting of first and second segments;

calculating the compatibility coefficient between every two segment pairs in the defined segment pairs;

defining new segment pairs by narrowing down the defined segment pairs by calculating local consistencies of the defined segment pairs on the basis of the calculated compatibility coefficients and by excluding segment pairs having lower local consistencies;

determining an optimum segment pair by repeating the calculating the compatibility coefficient and the defining new segment pairs by narrowing down the segment pairs;

calculating a feature quantity of a shift vector that links the first and second segments making up the optimum segment pair; and performing position matching between the pattern image and the reference data on the basis of the calculated feature quantity of the shift vector.

According to a second aspect of the invention, there is provided a program which causes a computer to perform a pattern matching method, the pattern matching method comprising:

detecting an edge of a pattern in a pattern image obtained by imaging the pattern;

segmenting the detected pattern edge to generate a first segment set consisting of first segments;

segmenting a pattern edge on reference data which serves as a reference for evaluating the pattern to generate a second segment set consisting of second segments;

combining any of the segments in the first segment set with any of the segments in the second segment set to define a segment pair consisting of first and second segments;

calculating the compatibility coefficient between every two segment pairs in the defined segment pairs;

defining new segment pairs by narrowing down the defined segment pairs by calculating local consistencies of the defined segment pairs on the basis of the calculated compatibility coefficients and by excluding segment pairs having lower local consistencies;

determining an optimum segment pair by repeating the calculating the compatibility coefficient and the defining new segment pairs by narrowing down the segment pairs;

calculating a feature quantity of a shift vector that links the first and second segments making up the optimum segment pair; and performing position matching between the pattern image and the reference data on the basis of the calculated feature quantity of the shift vector.

According to a third aspect of the invention, there is provided a semiconductor device manufacturing method, comprising a pattern matching method including:

detecting an edge of a pattern in a pattern image obtained by imaging the pattern;

segmenting the detected pattern edge to generate a first segment set consisting of first segments;

segmenting a pattern edge on reference data which serves as a reference for evaluating the pattern to generate a second segment set consisting of second segments;

combining any of the segments in the first segment set with any of the segments in the second segment set to define a segment pair consisting of first and second segments;

calculating the compatibility coefficient between every two segment pairs in the defined segment pairs;

defining new segment pairs by narrowing down the defined segment pairs by calculating local consistencies of the defined segment pairs on the basis of the calculated compatibility coefficients and by excluding segment pairs having lower local consistencies;

determining an optimum segment pair by repeating the calculating the compatibility coefficient and the defining new segment pairs by narrowing down the segment pairs;

calculating a feature quantity of a shift vector that links the first and second segments making up the optimum segment pair; and performing position matching between the pattern image and the reference data on the basis of the calculated feature quantity of the shift vector.

DETAILED DESCRIPTION OF THE INVENTION

Embodiments of the present invention will be described with reference to the accompanying drawings. While the embodiments will be described with respect to cases where CAD data is used as reference data for evaluating patterns, the present invention is not so limited. For example, a processed SEM image obtained from a well-manufactured pattern may be used as the reference data. While the embodiments will be described with respect to semiconductor patterns, the present invention is not limited to semiconductor patterns. The present invention can be applied to patterns in any article of manufacture.

(1) First Embodiment

Figure 1:
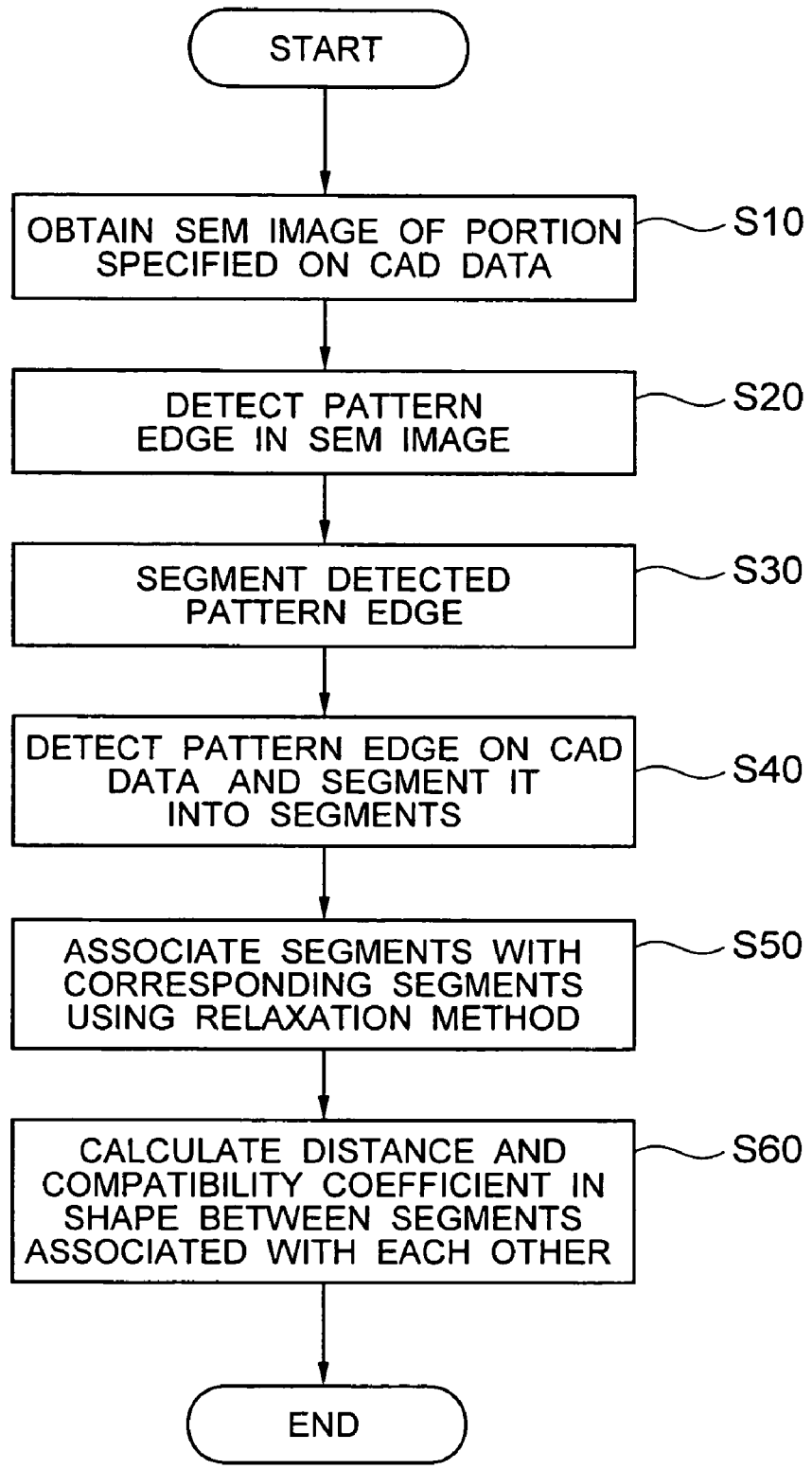
FIG. 1 is a flowchart showing an outline of a semiconductor pattern evaluating method by using pattern matching according to a first embodiment of the present invention.
Figure 2B:
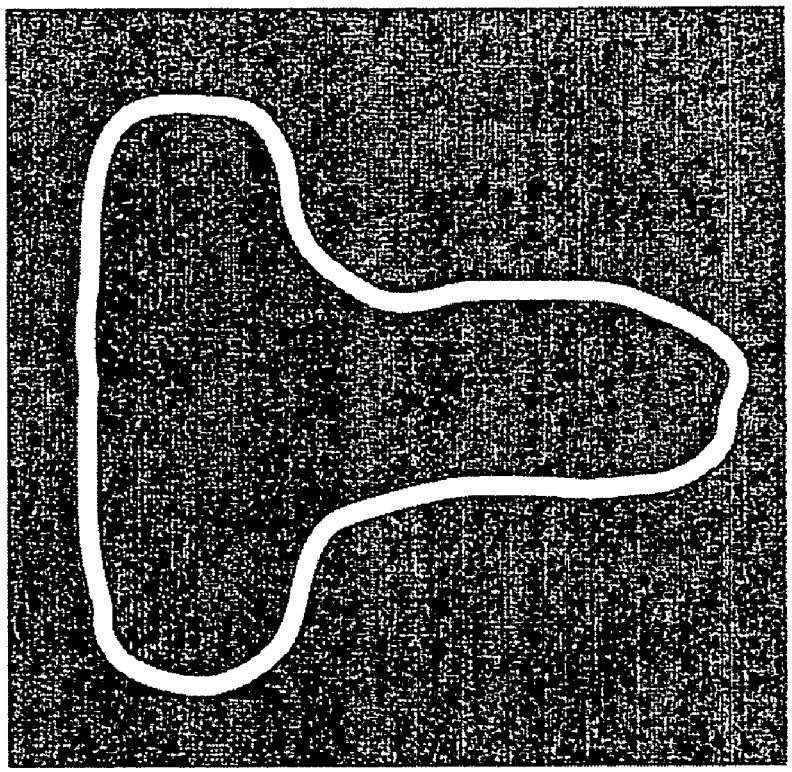
FIGS. 2A and 2B show a specific exemplary sample pattern to which the matching method shown in FIG. 1 is to be applied.
Figure 2A:
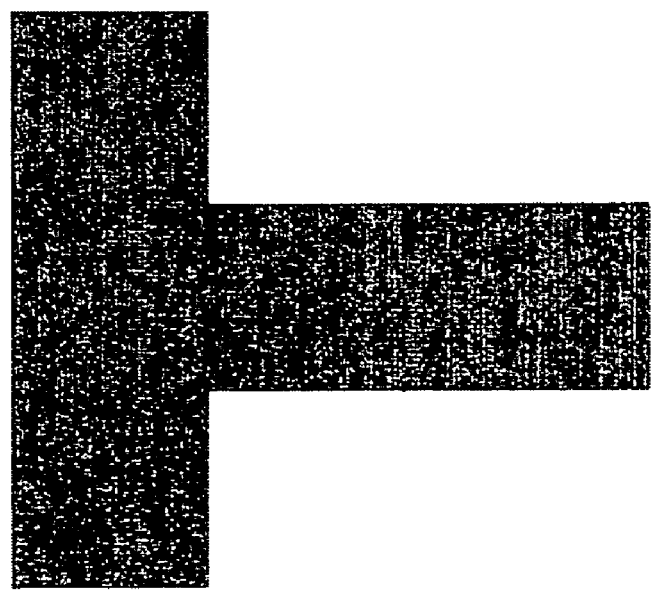

A first embodiment of the present invention will be described with reference to FIGS. 1 to 9. FIG. 1 is a flowchart showing an outline of a process of a semiconductor pattern evaluating method using a pattern matching method according to the first embodiment. FIG. 2 shows a specific exemplary sample pattern to which the matching method of the first embodiment is to be applied.

As shown in FIG. 1, a pattern to be measured is specified first on CAD data to obtain a corresponding SEM image (step S10). The pattern to be measured may be selected by an operator at his/her discretion or may be automatically selected with a tool such as a simulator. For example, if an optical simulator is used, a portion where a shortening is likely to occur may be defined as a critical pattern and a setting may be made so that such a critical pattern is automatically selected. By performing alignment under an electron microscope with a laser interferometer beforehand, an SEM image can be typically obtained with such precision that the image is included in the field of view.

Then, an edge in the pattern is detected in the obtained SEM image (step S20), and the detected pattern edge is segmented into segments having the geometry of a straight line or a circle segment (step S30).

Figure 3:
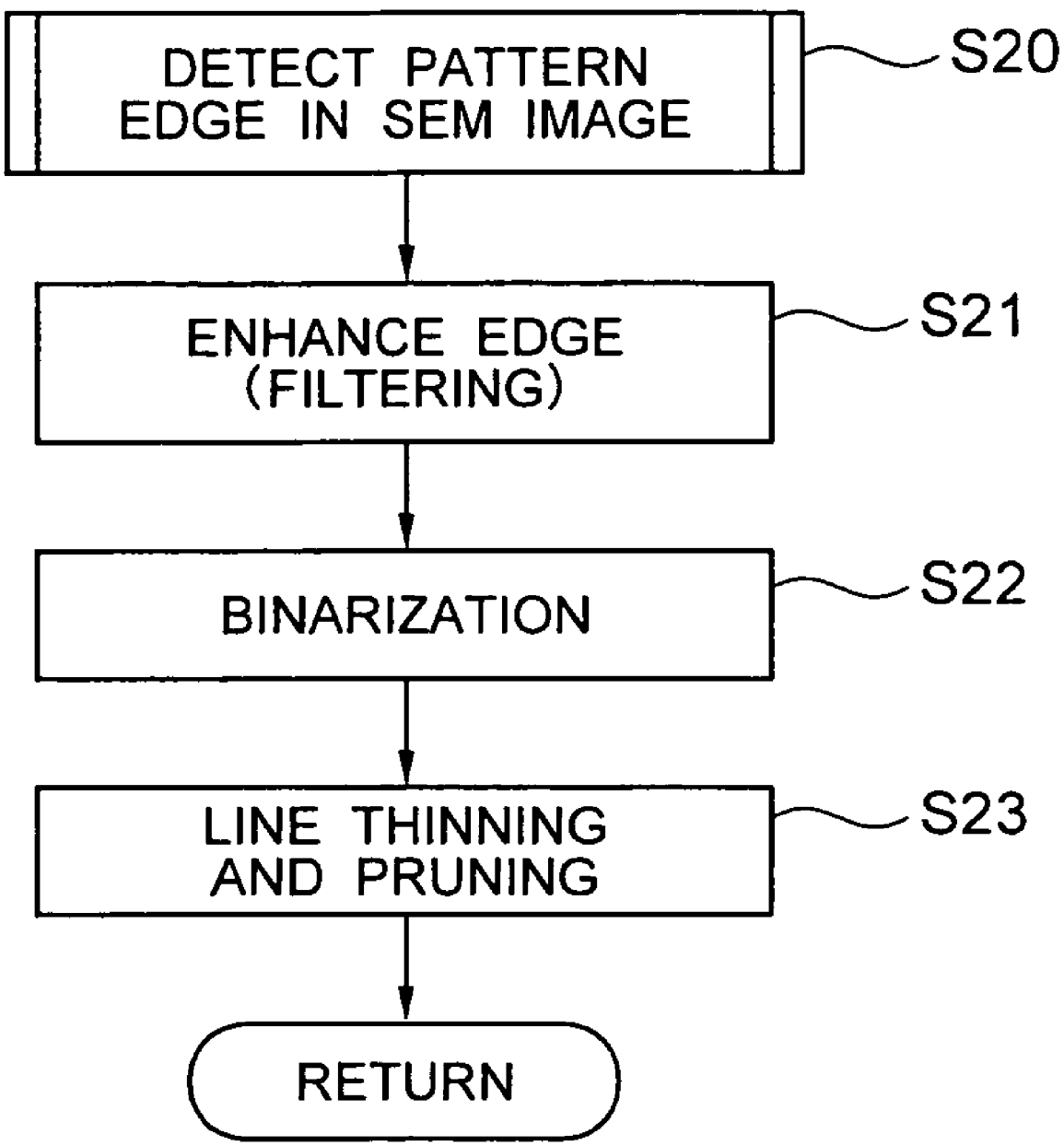
FIG. 3 is a flowchart showing one specific example of a method for detecting a pattern edge in an SEM image.

A specific example of the method for detecting a pattern edge in an SEM image is shown in the flowchart in FIG. 3.

First, an edge enhancement filter is applied to the SEM image (step S21). Then, the SEM image is binarized by using a method such as an automatic threshold determining method based on discriminant analysis (step S22). Finally, line thinning and pruning are applied (step S23) to obtain a line image (pattern edge). A method using matching with a contour model of a pattern as described in Japanese Patent Laid-Open No. 2003-178314 may be used for the edge detection. The description in Japanese Patent Laid-Open No. 2003-178314 is included herein by the reference.

Figure 4:
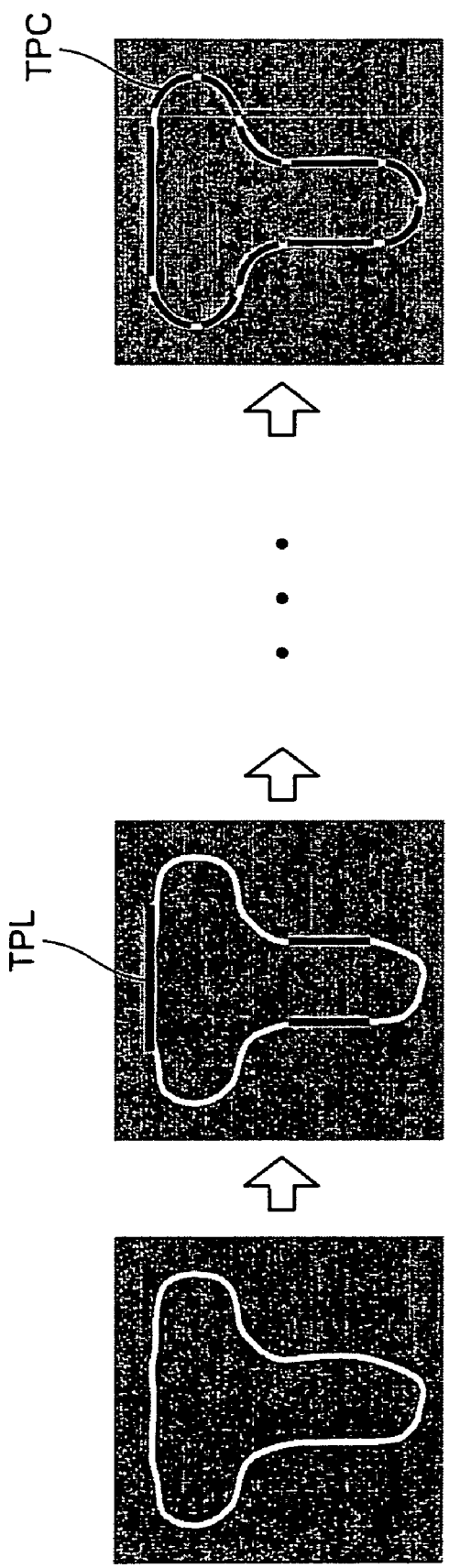
FIG. 4 is a diagram for illustrating a specific example of a method for segmenting a pattern edge in an SEM image.

Referring to FIG. 1 again, the pattern edge detected in the SEM image is segmented (step S30). According to this embodiment, templates TPL and TPC are provided beforehand for line patterns and circle-segment patterns, respectively. The templates TPL and TPC are matched with pattern edges to perform the segmentation as shown in FIG. 4. While the present embodiment is described with respect to an example in which a pattern edge is segmented into straight-line segments and circle segments for simplicity, the present invention is not so limited, of course. For example, function curves other than straight-line and circle segments may also be used or a chain code may be used to determine the curvature of a pattern edge and then segment the pattern edge.

Figure 5:
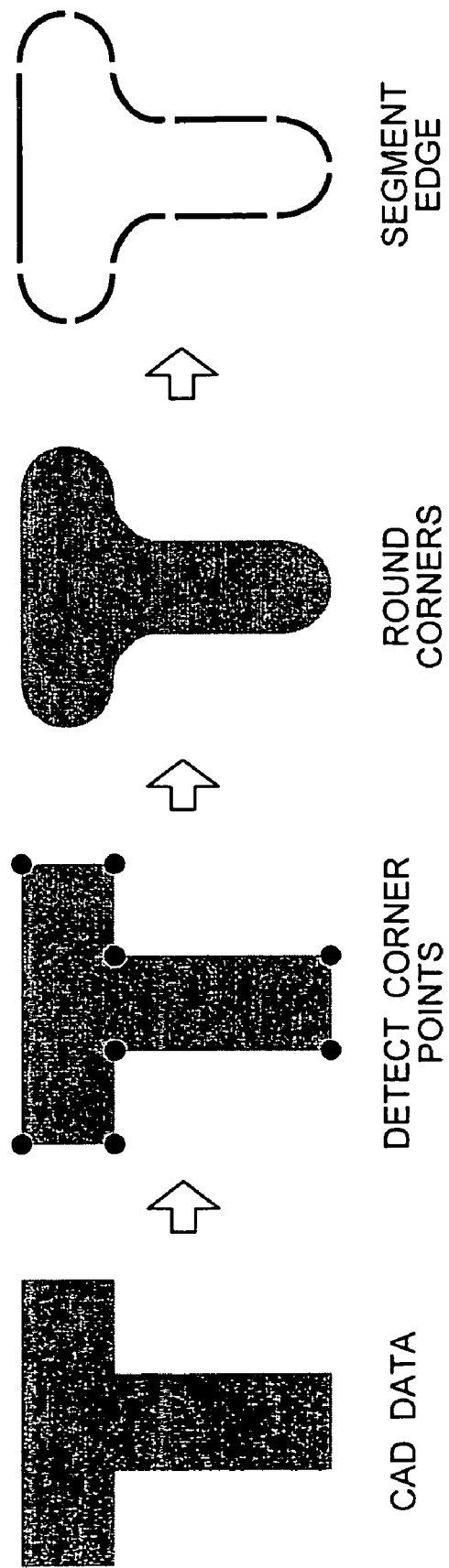
FIG. 5 is a diagram for illustrating a specific example of a method for segmenting pattern edge detected from CAD data.

Then, a pattern edge is detected in the CAD data and segmented (step S40 in FIG. 1). A specific segmentation method is shown in FIG. 5. In the method shown in FIG. 5, corner points of a pattern is detected in CAD data, the result of the detection is used to round the corner portions, circle segments are assigned to the corner portions and line segments are assigned to the other portions, thereby segmenting the pattern edge.

Then, the segments generated from the SEM image (hereinafter referred to as SEM segments) are associated with the segments generated from the CAD data (hereinafter referred to as CAD segments) by using a relaxation method (step S50 in FIG. 1). In this embodiment, a procedure and formulas in a typical relaxation method are used. A specific method for implementing the relaxation will be described below with reference to drawings.

First, a set of segments generated from the SEM image (hereinafter referred to as a SEM segment set) is defined as "ai" (i=1, 2, ..., n) and a set of segments generated from the CAD data (hereinafter referred to a CAD segment set) is defined as "λk" (k=1, 2, ..., m, NIL). Here, the SEM segment set corresponds to a first segment set and the CAD segment set corresponds to a second segment set, for example. It should be noted that SEM segments may include segments generated from noise or the like and such "insubstantial" segments have no CAD segments to be associated with. For the sake of treating such cases conveniently, k=NIL is used. NIL is sometimes called NUL.

Then, initial labels are generated and initial label probabilities are assigned. The term "label" refers to a state in which a CAD segment "λk" is associated with an SEM segment "ai". Multiple CAD segments can be associated with each individual SEM segment. A "label" may correspond to a pair of segments, for example. The initial labels are generated on the precondition that an SEG segment set and a CAD segment set are the same in the type of segment (such as vertical or horizontal line, or circle segment) and are within a specified distance (an expected range of displacements) from each other. Furthermore, a label probability "Pi (λk)" is defined for each label as an indicator of the strength of correspondence and a value (1/the number of assigned labels) is assigned as its initial value.

Then, a local consistency "Qi (λk)" of each label is calculated. For example, the local consistency "Qi (λk)" can be defied as:

$$Q_i(\lambda_k) = \frac{\sum_j \sum_l R_{ij}(\lambda_k, \lambda_l)}{n-1} \quad \text{(Formula 1)}$$

Here, "Rij (λk, λl)" is called a "compatibility coefficient" and indicates the compatibility between a state in which "ai" corresponds to "λk" and a state in which "aj" corresponds to "λl". Referring to FIGS. 6 to 9, an exemplary method for defining the compatibility coefficient "Rij (λk, λl)" will be described.

Figure 6:
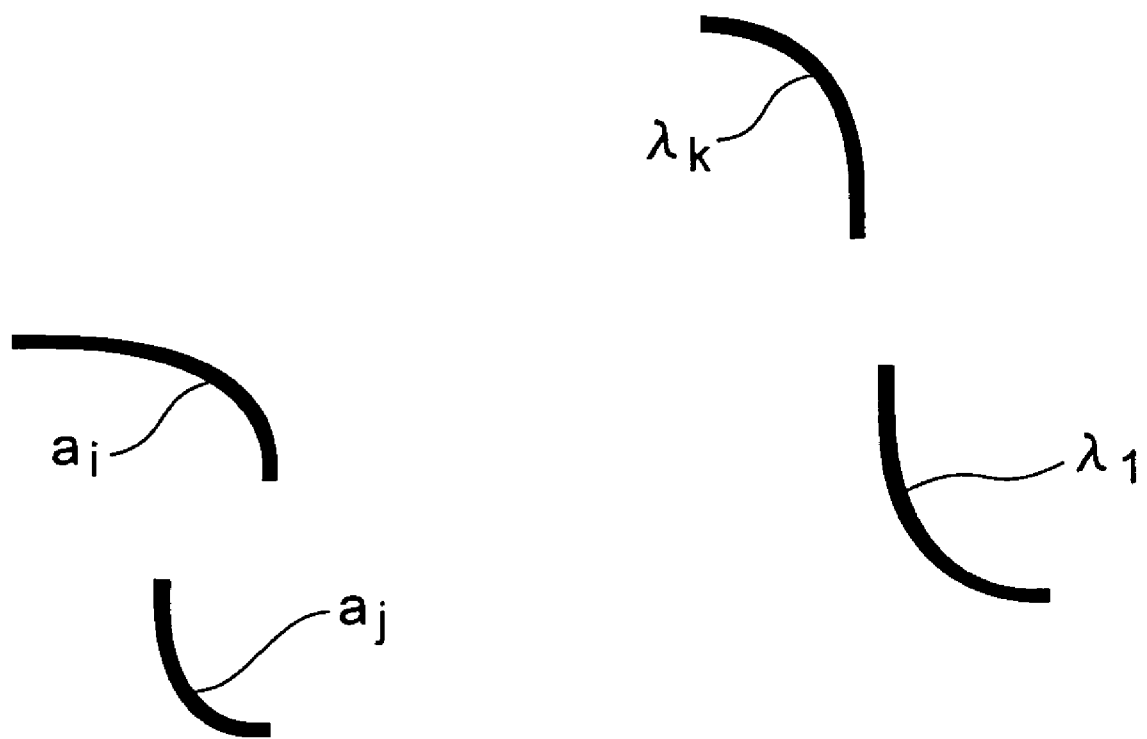
FIGS. 6 to 9 are diagrams for illustrating a specific example of a method for defining a compatibility coefficient.
Figure 7:
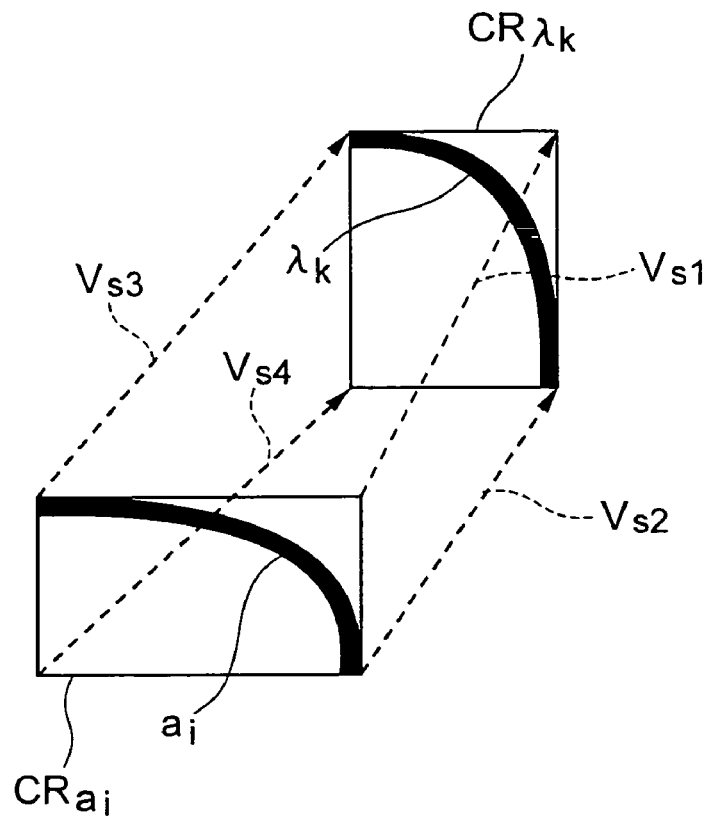
Figure 7:
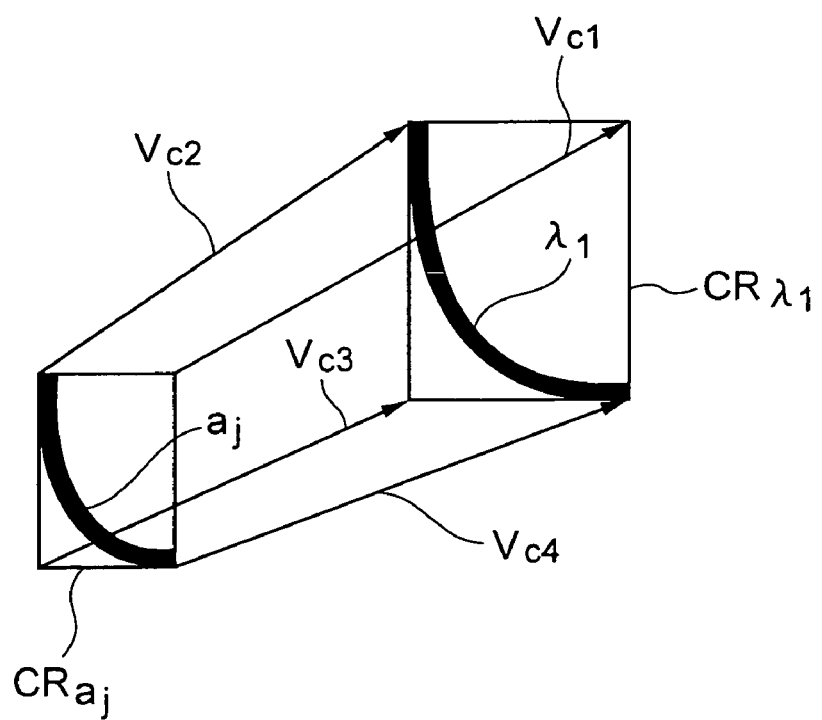

FIG. 6 shows specific examples of SEM segments "ai", "aj" and CAD segments "λk", "λl" to be associated with each other. A circumscribed rectangle "CRai", "CRλk", "CRaj", "CRλl" that surrounds each of segments to be associated with each other is generated and vectors that link the vertices of the circumscribed rectangles of the segments to be associated with each other (hereinafter referred to as shift vectors) are considered as shown in FIG. 7. A circumscribed rectangle can be defined by using the maximum and minimum value of the X-coordinate of a segment and the maximum and minimum values of the Y-coordinate of the segment, for example. Shift vectors Vs1 to Vs4 are defined between the circumscribed rectangle "CRai" of the SEM segment "ai" and the circumscribed rectangle "CRλk" of the CAD segment "λk" in the example shown in FIG. 7. Shift vectors "Vc1" to "Vc4" are defined between the circumscribed rectangle "CRaj" of the SEM segment "aj" and the circumscribed rectangle "CRλl" of the CAD segment "λl". Here, the circumscribed rectangles "CRai" and "CRaj" correspond to a first circumscribed rectangle and the circumscribed rectangles "CRλk" and "CRλl" correspond to a second circumscribe rectangle, for example.

Figure 8:
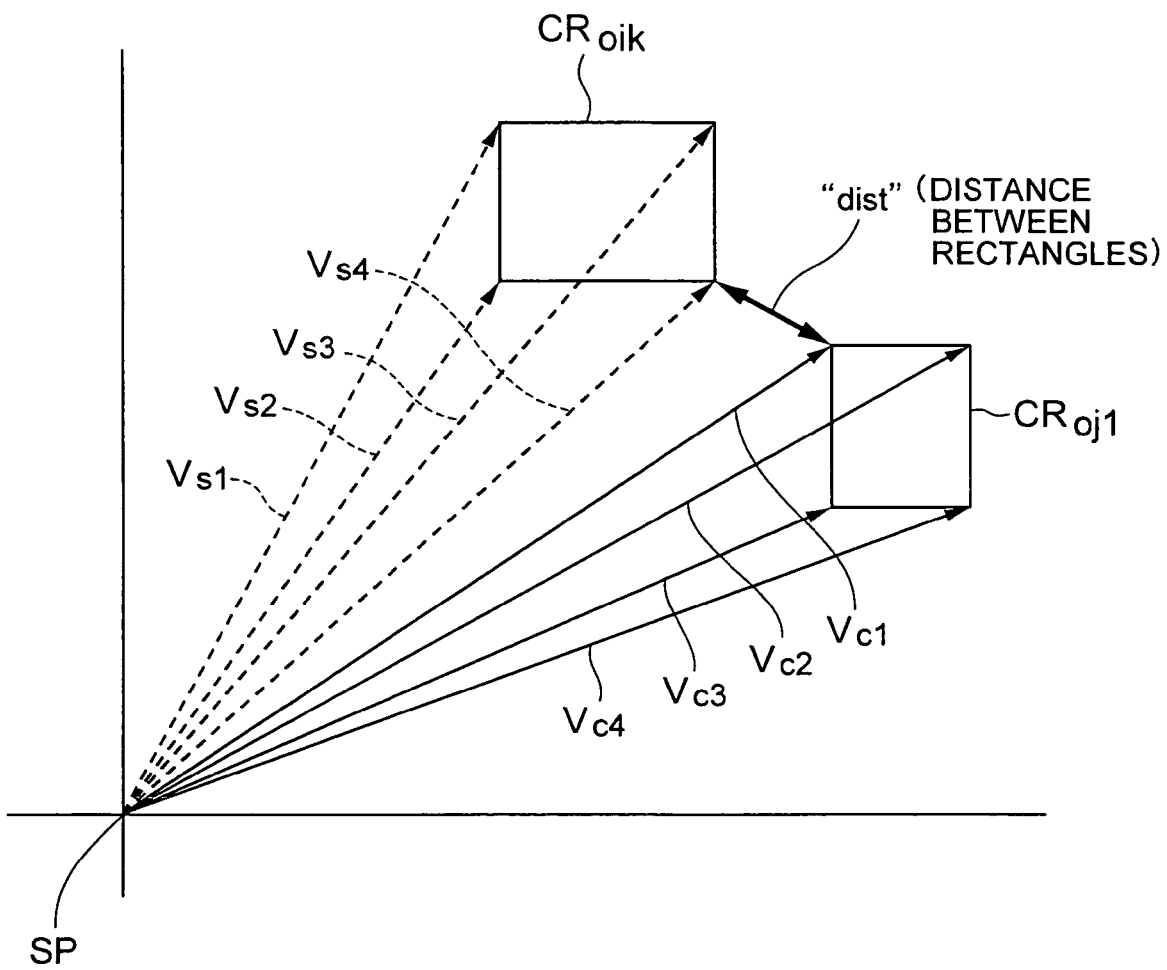
Figure 9:
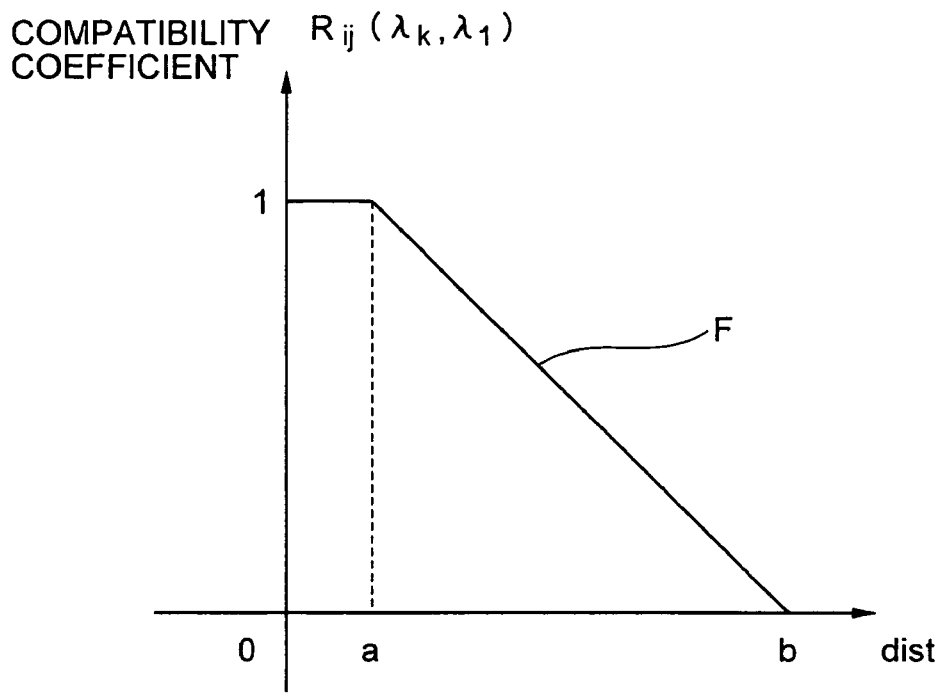

Then, as shown in FIG. 8, the shift vectors "Vs1" to "Vs4", "Vc1" to "Vc4" are plotted from the same origin (indicated by symbol SP in FIG. 8) to obtain regions where the circumscribed rectangles of the segments to be associated with each other overlap. Furthermore, letting "dist" denote the distance between the rectangle "CRoik" representing the region where the SEM segment "ai" and the CAD segment "λk" overlap and the rectangle "CRojl" representing the region where the SEM segment "aj" and the CAD segment "λl" overlap, then the compatibility coefficient "Rij (λk, λl)" is found by defining a function "F" shown in FIG. 9. Here, the function "F" is defined so as to take a great value when the value of "dist" is small. "Dist" is small when the positional relation between two segment pairs is close to each other, for example. The function used in this embodiment is such that the value of the compatibility coefficient "Rij (λk, λl)" linearly decreases as the value of "dist" increases, as shown in FIG. 9. The value "a" of the function "F" when Rij (λk, λl)=0 and the value "b" of the function "F" when the compatibility coefficient "Rij (λk, λl)" starts to become smaller than 1 are fixed values. If NIL is included in a CAD segment, the compatibility coefficient is assumed to be 0.5.

Then, the label probability "Pi (λk)" is updated by using Formula 2 and then the labels the updated label probabilities of which are smaller or equal to a threshold value are removed. The remaining labels are defined as new labels. In the present embodiment, the threshold value is 0.1.

$$P_i^{(new)}(\lambda_k) = \frac{P_i^{(old)}(\lambda_k) \cdot Q_i(\lambda_k)}{\sum_l P_i^{(old)}(\lambda_l) \cdot Q_i(\lambda_l)} \quad \text{(Formula 2)}$$

The above-described operation is repeated for new labels. When the label probability "Pi (λk)" converges, the process for associating the SEM segments with CAD segments ends. Matching between the segments associates with each other can be accomplished by calculating a feature quantity, for example the average or median of the shift vectors.

Returning to FIG. 1, the distance between the segments associated with each other and the degree of matching between them in shape are calculated (step S60) to evaluate the semiconductor pattern.

(2) Second Embodiment

In the first embodiment, a case where two SEM segments ("ai", "aj"; i≠j) correspond to the same CAD segment ("λk", "λl"; k=1) is treated as being acceptable. Accordingly, SEM segments "ai" and "aj" that are parallel to each other and the distance between the segments is small as shown in FIG. 10A can be associated with the same CAD segment "λk" (="λl").

Figure 10A:
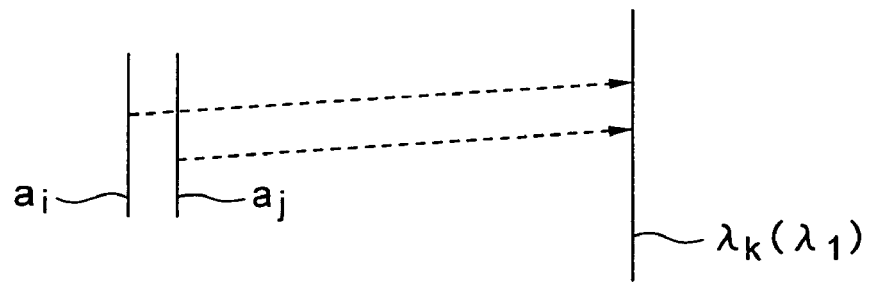
FIGS. 10A and 10B are diagrams for illustrating a second embodiment of the present invention.

However, the SEM segments "ai" and "aj" in FIG. 10A often represent both edges of a conductor. Therefore, it is undesirable to associate such SEM segments with the same CAD segment.

Figure 10B:
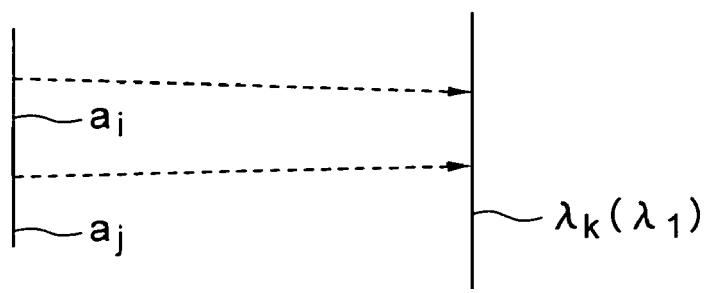

Therefore, if SEM segments "ai" and "aj" are vertically arranged as shown in FIG. 10B, normal calculation of the compatibility coefficient is performed; on the other hand, if SEM segments "ai" and "aj" are parallel to each other as shown in FIG. 10A, the compatibility coefficient is set to a small value. More specifically, the determination as to whether SEM segments "ai" and "aj" are parallel to each other is made by comparing the y-coordinate of the SEM segment "ai" with that of the SEM segment "aj" to see whether they overlap each other. If it is determined that they are parallel, then the compatibility coefficient is set to 0.

(3) Third Embodiment

Figure 11:
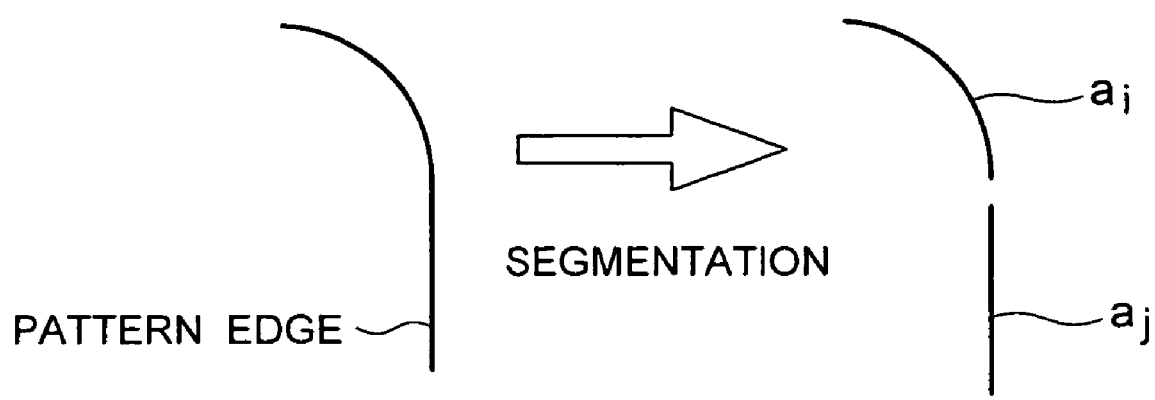
FIG. 11 is a diagram for illustrating a third embodiment of the present invention.

In the first embodiment, the connectivity between two SEM segments ("ai", "aj") is not taken into consideration in calculating the compatibility coefficient. However, some SEM segments, like the segments "ai" and "aj" shown in FIG. 11, which are detected as connected segments can be generated as separate circle- and line-segments. In the third embodiment, prior to generating SEM segments, information about connectivity in an unsegmented pattern edge is stored. The connectivity between SEM segments is compared with the connectivity between CAD segments in calculating the degree of matching. If they do not agree with each other, the compatibility coefficient is set to a value, for example 0, smaller than the value of the compatibility coefficient that is set in the case where they agree with each other. The information about the connectivity between unsegmented pattern edges corresponds to information of first connectivity, for example, and the information about the connectivity between unsegmented CAD segments corresponds to information about second connectivity, for example.

(4) Program

The process in each of the pattern matching methods in the embodiments described above may be integrated into a program and the program may be installed in a computer capable of image processing to cause it to execute the program. This enables the process in each of the pattern matching methods according to the present invention to be implemented by using a general-purpose computer capable of image processing. The program for causing a computer to execute the process in each pattern matching method described above may be stored in a recording medium such as a flexible disk or a CD-ROM and installed in the computer to cause it to execute the program. The recording medium is not limited to a portable one such as a magnetic disk or optical disk. It may be a fixed recording medium such as a hard disk unit or a memory. Furthermore, the program in which the process in each pattern matching method described above may be delivered through a communication network (including a wireless communication network) such as the Internet. The program in which the process in each pattern matching method described above may be encrypted, modulated, or compressed and delivered through a wired or wireless network such as the Internet or stored in a recording medium and delivered.

(5) Semiconductor Device Manufacturing Method

The pattern matching methods described in the first to third embodiments can be introduced in an inspection process in semiconductor device manufacturing to enable position matching with high accuracy. Consequently, semiconductor devices can be manufactured with high throughput and yield.

While some of the embodiments of the present invention have been described, the present invention is not limited to these embodiments. It should be understood that variations or modifications of the present invention can be practiced within the scope thereof.

What is claimed is:

1. A non-transitory computer readable recording medium containing a program which causes a computer to execute a pattern matching, the pattern matching comprising:
   detecting a first pattern edge in a pattern image obtained by imaging the pattern;
   generating a first segment set comprising first straight-line and curved-line pattern segments by segmenting the detected first pattern edge with a plurality of predetermined first straight-line and curved-line patterns;
   generating a second segment set comprising second straight-line and curved-line pattern segments by segmenting a second pattern edge on reference data into a plurality of second straight-line and curved-line patterns;
   combining any of the segments in the first segment set with any of the segments in the second segment set to define segment pairs consisting of first and second segments of the first and second segment sets, respectively;
   calculating a compatibility coefficient between every two segment pairs in the defined segment pairs, the compatibility coefficient between each two segment pairs indicating a compatibility between a first segment pair and a second segment pair;
   defining new segment pairs by narrowing down the defined segment pairs by calculating local consistencies of the defined segment pairs on the basis of the calculated compatibility coefficients and by excluding segment pairs having lower local consistencies;
   determining an optimum segment pair by repeating the calculating the compatibility coefficient and the defining new segment pairs by narrowing down the segment pairs;
   calculating a feature quantity of a shift vector that links the first and second segments making up the optimum segment pair; and
   performing position matching between the pattern image and the reference data on the basis of the calculated feature quantity of the shift vector,
   wherein the calculating the compatibility coefficient between the first segment pair and the second segment pair includes:
      defining a first circumscribed rectangle and a second circumscribed rectangle respectively surrounding a first segment of the first segment pair and a second segment of the first segment pair;
      defining a third circumscribed rectangle and a fourth circumscribed rectangle respectively surrounding a first segment of the second segment pair and a second segment of the second segment pair;
      defining a first set of shift vectors each running from a vertex of the first circumscribed rectangle to a corresponding vertex of the second circumscribed rectangle;
      defining a second set of shift vectors each running from a vertex of the third circumscribed rectangle to a corresponding vertex of the fourth circumscribed rectangle;
      plotting the first set of shift vectors and the second set of shift vectors from a same origin;
      defining a first shift rectangle and a second shift rectangle respectively formed by ends of the first set of shift vectors and the second set of shift vectors; and
      defining the compatibility coefficient based on a distance between the first shift rectangle and the second shift rectangle.

2. The computer readable recording medium according to claim 1,
   wherein the plurality of predetermined first straight-line and curved-line patterns comprise a function curve.

3. The computer readable recording medium according to claim 1,
   wherein the segmenting the detected first pattern edge includes determining a curvature of the pattern edge by using a chain code.

4. The computer readable recording medium according to claim 1,
   wherein the pattern matching further comprises rounding corner portions in the reference data.

5. The computer readable recording medium according to claim 1,
   wherein the defining the segment pairs includes checking a relative positional relation between the first segments; and
   the calculating the compatibility coefficient further includes, if there are first segments that are substantially parallel to each other, setting the compatibility coefficient of the substantially parallel first segments to a value smaller than the value of the compatibility coefficient between first segments that are in other positional relations with each other.

6. The computer readable recording medium according to claim 1,
   wherein the generating the first segment set includes storing information about first connectivity representing whether or not the generated first segments are connected with each other before the segmentation;
   the generating the second segment set includes storing information about second connectivity representing whether or not the generated second segments are connected with each other before the segmentation; and the calculating the compatibility coefficient further includes comparing the first connectivity with the second connectivity and, if they do not agree with each other, setting the compatibility coefficient to a value smaller than the value of compatibility coefficient that is set in the case where the first connectivity agrees with the second connectivity.

7. The non-transitory computer readable recording medium according to claim 1, wherein the pattern image is obtained using a scanning electron microscope.

8. A semiconductor device manufacturing method, comprising:

obtaining an image of a pattern using an imaging device; and performing a pattern matching method using a processor, the pattern matching method comprising:

detecting a first pattern edge in the pattern image;

generating a first segment set comprising first straight-line and curved-line pattern segments by segmenting the detected first pattern edge with a plurality of predetermined first straight-line and curved-line patterns;

generating a second segment set comprising second straight-line and curved-line pattern segments by segmenting a second pattern edge on reference data into a plurality of second straight-line and curved-line patterns;

combining any of the segments in the first segment set with any of the segments in the second segment set to define segment pairs consisting of first and second segments of the first and second segment sets, respectively;

calculating a compatibility coefficient between every two segment pairs in the defined segment pairs, the compatibility coefficient between each two segment pairs indicating a compatibility between a first segment pair and a second segment pair;

defining new segment pairs by narrowing down the defined segment pairs by calculating local consistencies of the defined segment pairs on the basis of the calculated compatibility coefficients and by excluding segment pairs having lower local consistencies;

determining an optimum segment pair by repeating the calculating the compatibility coefficient and the defining new segment pairs by narrowing down the segment pairs;

calculating a feature quantity of a shift vector that links the first and second segments making up the optimum segment pair; and performing position matching between the pattern image and the reference data on the basis of the calculated feature quantity of the shift vector, wherein the calculating the compatibility coefficient between the first segment pair and the second segment pair includes:

defining a first circumscribed rectangle and a second circumscribed rectangle respectively surrounding a first segment of the first segment pair and a second segment of the first segment pair;

defining a third circumscribed rectangle and a fourth circumscribed rectangle respectively surrounding a first segment of the second segment pair and a second segment of the second segment pair;

defining a first set of shift vectors each running from a vertex of the first circumscribed rectangle to a corresponding vertex of the second circumscribed rectangle;

defining a second set of shift vectors each running from a vertex of the third circumscribed rectangle to a corresponding vertex of the fourth circumscribed rectangle;

plotting the first set of shift vectors and the second set of shift vectors from a same origin;

defining a first shift rectangle and a second shift rectangle respectively formed by ends of the first set of shift vectors and the second set of shift vectors; and defining the compatibility coefficient based on a distance between the first shift rectangle and the second shift rectangle.

9. The semiconductor device manufacturing method according to claim 8, wherein the plurality of predetermined first straight-line and curved-line patterns comprise a function curve.

10. The semiconductor device manufacturing method according to claim 8, wherein the defining the segment pairs includes checking a relative positional relation between the first segments; and the calculating the compatibility coefficient further includes, if there are first segments that are substantially parallel to each other, setting the compatibility coefficient of the substantially parallel first segments to a value smaller than the value of the compatibility coefficient between first segments that are in other positional relations with each other.

11. The semiconductor device manufacturing method according to claim 8, wherein the generating the first segment set includes storing information about first connectivity representing whether or not the generated first segments are connected with each other before the segmentation;

the generating the second segment set includes storing information about second connectivity representing whether or not the generated second segments are connected with each other before the segmentation; and the calculating the compatibility coefficient includes comparing the first connectivity with the second connectivity and, if they do not agree with each other, setting the compatibility coefficient to a value smaller than the value of compatibility coefficient that is set in the case where the first connectivity agrees with the second connectivity.

12. The semiconductor device manufacturing method according to claim 8, wherein the obtaining an image of a pattern is performed using a scanning electron microscope.

* * * * *